UNITED STATES PATENT OFFICE.

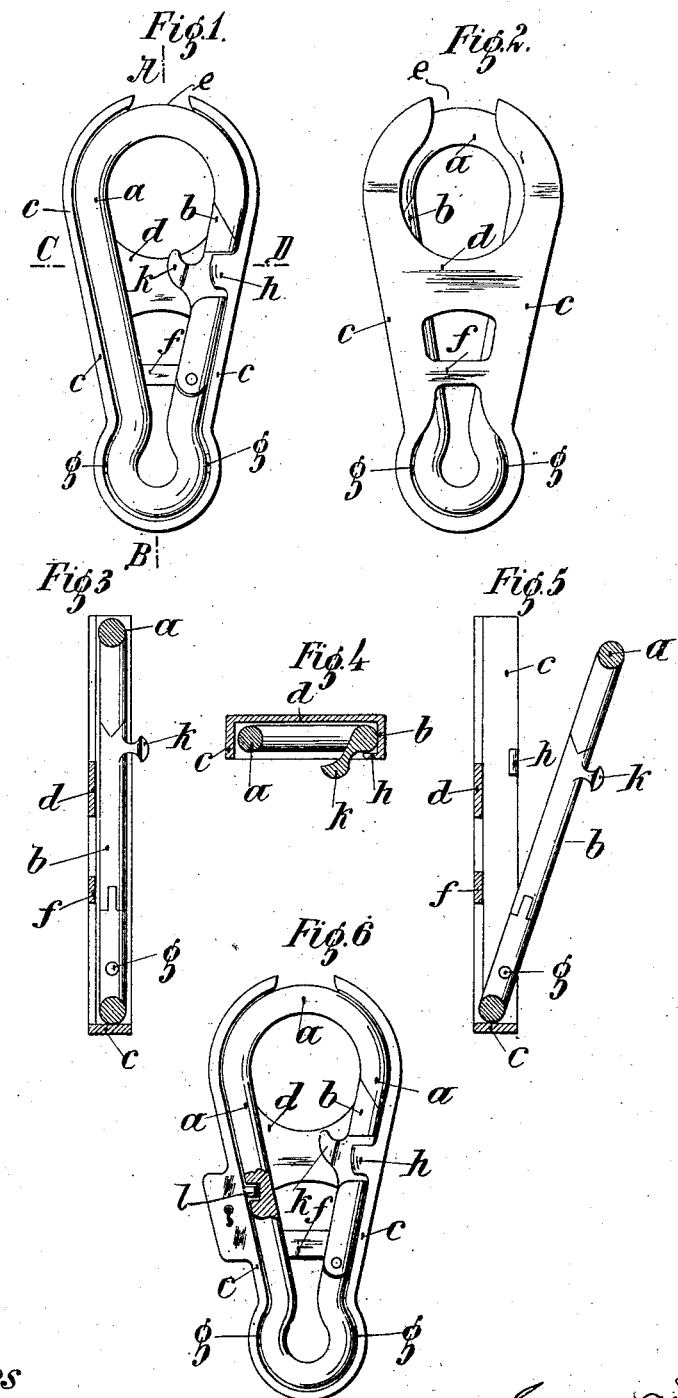

ERNST WLATNIGG, OF KLAGENFURT, AUSTRIA-HUNGARY.

SAFETY-HOOK.

No. 874,647.

Specification of Letters Patent.

Patented Dec. 24, 1907.

Application filed October 19, 1906. Serial No. 339,694.

*To all whom it may concern:*

Be it known that I, ERNST WLATNIGG, a citizen of the Empire of Austria-Hungary, residing at Klagenfurt, Carinthia, and Empire of Austria-Hungary, have invented certain new and useful Improvements in Safety-Hooks, of which the following is a specification, reference being had therein to the accompanying drawing.

The present invention has for its object the improvement in safety hooks, the purpose of which is to prevent the bent hook arm or fixed member of the hook from coming open and the movable member from swinging outwards, that is to say to prevent the accidental opening of the hook.

The invention consists broadly in mounting the hook in a recessed casing in such a manner that it can swing out partially, and retaining it in such a position that the members of the hook are surrounded by the edges of the casing.

In Figures 1 and 2 of the accompanying drawing a hook in accordance with the invention is illustrated in front and rear elevation. Figs. 3 and 4 represent sections on the lines A—B, and C—D of Fig. 1. Fig. 5 is a view corresponding to Fig. 3, showing the hook swung outward of the casing. Fig. 6 illustrates a modified constructional form.

The hook itself consisting of the members $a$, $b$, is constructed in the usual manner and mounted in a casing $c$ by means of pins $g$, so that it is able to assume either an outwardly swung position represented in Fig. 5 or the position shown in Figs. 1 to 3, in which it is incased by the upturned edges of the casing $c$.

In the position Fig. 5 the hook can be used in the usual manner, that is to say a ring may be introduced into it by swinging the movable member $b$ inwards, while when swung back in the position (Figs. 1 to 3) both members $a$, $b$ of the hook are inclosed in the casing $c$ and it is quite impossible for the parts of the hook to open. Moreover, accidental inward movement of the rocking member $b$ could not set free the ring held in the hook to slip out, as the ring is prevented from reaching the open part of the hook by the base plate of the casing which is provided with a gap $e$ only deep enough to freely lodge said ring.

The sides of the casing $c$ corresponding to the shape of the curved members of the hook are connected one with the other by means of a base plate cut out in such a manner as to leave only two webs $d$ and $f$.

In the position in which the hook $a$, $b$ is in contact with the webs $d$, $f$ and is closely surrounded by the edges of casing $c$, it is firmly held, owing to the fact that a projecting nose $h$ is provided at an appropriate place on the casing $c$, the member $b$ of the hook gliding over this nose when the hook is swinging inwards into the position of rest.

In order to render it possible (when the hook should swing out of the casing) to press its member $b$ inwards, the latter is provided at a suitable place with a catch $k$.

The nose by means of which the hook is held in the casing may be arranged at any other convenient place on the casing preferably with a beveled surface over which the hook slides on swinging into the casing.

To open the hook and to remove the ring, loop or some part of a harness, it is only necessary to turn the hook member $b$ inwardly by means of its catch $k$, so as to come free from under the projection $h$, then the hook may be swung on its pivots $g$ out of the casing and the part held by the hook can be removed.

In order to secure the hook in a locked position, a small lock may be provided on one side of the frame as shown in Fig. 6 the bolt $l$ of this hook being adapted to enter into a suitable hole of the fixed member of the hook, thus securing it in the casing in a locked position.

Having thus described my invention, what I claim is:

1. A safety hook composed of a fixed member and a movable member pivotally connected thereto, in combination with a casing having upturned edge walls closely contacting with the edges of the fixed member and the movable member of the hook, substantially as described.

2. A safety hook composed of a fixed member and a movable member pivotally connected thereto, in combination with a casing having upturned edge walls closely contacting with the edges of the fixed member and the movable member of the hook, and a lip $h$ projecting from the edge of the casing to overlap the movable hook member substantially as described.

3. A safety hook composed of a fixed member and a movable member pivotally connected thereto, in combination with a casing having upturned edge walls closely contacting with the edges of the fixed member and the movable member of the hook, a lock secured to the casing the hook being provided with a hole adapted to receive the bolt of the lock, substantially as described.

4. A safety hook composed of a fixed member and a movable member pivotally connected thereto, in combination with an open faced casing having upturned edge walls closely contacting the edges of the hook, and pivots connecting the hook to the edge walls of the casing, substantially as described.

5. A safety hook composed of a fixed member and a movable member pivotally connected thereto, in combination with an open faced casing having upturned edge walls closely contacting the edges of the hook, and pivots connecting the hook to the edge walls of the casing, and a lip $h$ projecting from the edge of the casing to overlap the movable hook member substantially as described.

6. A safety hook composed of a fixed member and a movable member pivotally connected thereto, in combination with an open faced casing having upturned edge walls closely contacting the edges of the hook and pivots connecting the hook to the edges of the casing, a lock secured to the casing, the hook being provided with a hole adapted to receive the bolt of the hook, substantially as described.

In testimony whereof I hereunto affix my signature in presence of two witnesses.

ERNST WLATNIGG.

Witnesses:
  FRIEDRICH BINDER,
  ALVESTO S. HOGUE.